(12) United States Patent
Pressnitzer et al.

(10) Patent No.: US 10,673,538 B2
(45) Date of Patent: Jun. 2, 2020

(54) METHOD FOR TRANSMITTING AN ITEM OF INFORMATION TO BE RECORDED

(71) Applicants: URGO RECHERCHE INNOVATION ET DEVELOPPEMENT, Chenove (FR); CENTRE NATIONAL DE LA RECHERCHE SCIENTIFIQUE (CNRS), Paris (FR); ECOLE NORMALE SUPERIEURE, Paris (FR); ECOLE SUPERIEURE DE PHYSIQUE ET DE CHIMIE INDUSTRIELLES DE LA VILLE DE PARIS, Paris (FR); UNIVERSITE PARIS DIDEROT—PARIS 7, Paris (FR)

(72) Inventors: Daniel Pressnitzer, Fontainebleau (FR); Laure Cornu, Paris (FR); Hervé Le Lous, Paris (FR)

(73) Assignees: URGO RECHERCHE INNOVATION ET DEVELOPPEMENT, Chenove (FR); CENTRE NATIONAL DE LA RECHERCHE SCIENTIFIQUE (CNRS), Paris (FR); ECOLE NORMALE SUPERIEURE, Paris (FR); ECOLE SUPERIEURE DE PHYSIQUE ET DE CHIMIE INDUSTRIELLES DE LA VILLE DE PARIS, Paris (FR); UNIVERSITE PARIS DIDEROT—PARIS 7, Paris (FR)

( * ) Notice: Subject to any disclaimer, the term of this patent is extended or adjusted under 35 U.S.C. 154(b) by 291 days.

(21) Appl. No.: 15/744,939

(22) PCT Filed: Jul. 8, 2016

(86) PCT No.: PCT/EP2016/066369
§ 371 (c)(1),
(2) Date: Jan. 15, 2018

(87) PCT Pub. No.: WO2017/009266
PCT Pub. Date: Jan. 19, 2017

(65) Prior Publication Data
US 2018/0212688 A1 Jul. 26, 2018

(30) Foreign Application Priority Data
Jul. 15, 2015 (FR) ..................................... 15 01497

(51) Int. Cl.
*H04B 11/00* (2006.01)
*G10L 21/06* (2013.01)

(52) U.S. Cl.
CPC .............. *H04B 11/00* (2013.01); *G10L 21/06* (2013.01)

(58) Field of Classification Search
CPC ................................. H04B 11/00; G10L 21/06
See application file for complete search history.

(56) References Cited

U.S. PATENT DOCUMENTS

| 5,423,073 A | 6/1995 | Ogawa | |
|---|---|---|---|
| 2013/0197918 A1* | 8/2013 | Ansell | G10L 19/00 704/500 |

(Continued)

FOREIGN PATENT DOCUMENTS

| FR | 2973611 A1 | 10/2012 | |
|---|---|---|---|
| FR | 3039026 A1 * | 1/2017 | ............. G10L 21/06 |
| WO | WO-2017009266 A1 * | 1/2017 | ............. H04B 11/00 |

*Primary Examiner* — Daniel Pihulic
(74) *Attorney, Agent, or Firm* — Harness, Dickey & Pierce, PLC

(57) ABSTRACT

The disclosure relates to a method for transmitting an item of information in a communication channel linking a transmitter to a recipient, the method including the following successive steps: the determination, by the transmitter, of a first intelligible sound signal representative of the item of (Continued)

information to be transmitted, the acoustic processing, by the transmitter, of the first sound signal so as to produce a second sound signal unintelligible to the recipient, the transmission of the second sound signal from the transmitter to the recipient, the transmission of the first sound signal from the transmitter to the recipient, the transmission of the first sound signal being triggered by the transmission of the second sound signal, the second transmission of the second sound signal from the transmitter to the recipient, the second transmission of the second sound signal being triggered by the transmission of the first signal.

10 Claims, 3 Drawing Sheets

(56) References Cited

U.S. PATENT DOCUMENTS

| | | | | |
|---|---|---|---|---|
| 2013/0234824 A1* | 9/2013 | Lozovsky | ............. | H04B 11/00 340/4.3 |
| 2014/0050321 A1* | 2/2014 | Albert | ................... | H04W 12/04 380/270 |
| 2015/0188643 A1* | 7/2015 | Ansell | .................... | G10L 19/00 704/205 |
| 2016/0365932 A1* | 12/2016 | Carter | ................... | H04B 11/00 |
| 2017/0206772 A1* | 7/2017 | Klimanis | ............. | G08B 25/008 |
| 2018/0212688 A1* | 7/2018 | Pressnitzer | ............ | H04B 11/00 |

* cited by examiner

METHOD FOR TRANSMITTING AN ITEM OF INFORMATION TO BE RECORDED

CROSS-REFERENCE TO RELATED APPLICATIONS

This application is a National Phase Entry of International Patent Application No. PCT/EP2016/066369, filed on Jul. 8, 2016, which claims priority to French Patent Application Serial No. FR1501497, filed on Jul. 15, 2015, both of which are incorporated by reference herein.

TECHNICAL FIELD

The present invention relates generally to a method for transmitting an item of information in a communication channel connecting a transmitter to a recipient.

BACKGROUND

The capacity for recording, preserving and restoring an item of information has long been a central topic of study for the knowledge acquisition processes. The conditions relating to the capacity for recording, preserving and restoring an item of information are not always fully known, despite obvious potential applications. What is known is that the way an item of information was processed during the transmission phase may be critical to the performance related to the recording, preservation and restoration of an item of information. In particular, how to transmit and process an item of information seems to have a significant effect. Experiments have shown that the performance related to the capacity for recording, preserving and restoring an item of information were all the better since the item of information to be transmitted induced deep processing requiring the recipient of an item of information to develop voluntarily around the meaning of the item of information to be recorded, preserved and restored. This was interpreted by proposing that the capacity for recording, preserving and restoring an item of information is closely related to how an item of information is transmitted and processed. Therefore, modulating the way an item of information is processed during the transmission phase naturally has a direct effect on the capacity for recording, preserving and restoring an item of information.

It has since been shown that an ambiguous item of information initially difficult to understand, whose meaning is revealed by a subsequent index, was very effectively recorded, preserved and restored. A typical test experiment by Auble and Franks was for example to present a first item of information consisting of the sentence "the haystack was useful because the canvas was torn". After a 5-second pause, a second "parachute" item of information appeared on the screen. Once the "parachute" item of information was transmitted to the recipient, the meaning of the sentence "the haystack was useful because the canvas was torn" became perfectly clear. For such tests, with indices consisting of an item of information, the capacity for restoring the item of information transmitted to the recipient was better than other tests where the meaning of the first item of information was initially clear. It has been shown that perplexity initially caused by unintelligibility of the first item of information allows deeper processing and greater capacity for recording, preserving and restoring data.

These prior techniques for transmitting an item of information to record, preserve and restore it implement the resolution of semantic ambiguity of an item of information to be transmitted. Such techniques require the use of an item of information that is verbal material whose processing requires human intervention for the definition of terms of the first unintelligible item of information. Also, the implementation of such techniques is difficult to reproduce.

SUMMARY

In this context, the problem posed here is to propose a method to improve the capacity for recording, preserving and restoring an item of information for a recipient. More particularly, the problem addressed by the present invention is to improve the reproducibility of the method while avoiding human intervention.

The solution proposed by the present invention is that the method for transmitting an item of information in a communication channel connecting a transmitter to a recipient comprises the following successive steps:

determining, by the transmitter, a first intelligible sound signal representative of said item of information to be transmitted, acoustic processing, by the transmitter, of said first sound signal to produce a second unintelligible sound signal for the recipient, transmission of said second sound signal from the transmitter to the recipient, transmission of said first sound signal from the transmitter to the recipient, said transmission of said first sound signal being triggered by said first transmission of said second sound signal, the second transmission of said second sound signal from the transmitter to the recipient, said second transmission of said second sound signal being triggered by said transmission of said first signal.

Such a method for transmitting an item of information overcomes the aforementioned drawbacks and improves the capacities for recording, preserving and restoring an item of information to a recipient. This method has several advantages relative to prior techniques. The capacities for recording, preserving and restoring an item of information are induced by acoustic processing, therefore allowing the use of a first signal comprising totally arbitrary verbal material. The effect induced by the acoustic processing is specific to a first intelligible sound signal which may contain an infinite variety of information to transmit, which item of information may be of any nature as an educational item of information.

In one embodiment, the steps of transmitting said first sound signal from the transmitter to the recipient, said transmission of said first sound signal being triggered by said transmission of said second sound signal and of second transmission of said second sound signal from the transmitter to the recipient, said second transmission of said second sound signal being triggered by said transmission of said first signal are triggered after a predetermined period, preferably a period substantially equal to 250 ms.

In one embodiment, during the processing step, a processing algorithm is implemented to produce said second signal, the processing algorithm implementing the following steps:

sampling said first sound signal a first time, filtering said first sound signal to permit the passage of high frequencies of said first sound signal without attenuating them, said high frequencies being preferably predefined as being greater than 50 Hz, and attenuating low frequencies relatively lower than said high frequencies, then sub-sampling said first sound signal.

In one embodiment, during the first sampling of said first sound signal, the first sampling frequency is substantially equal to 44.1 kHz. In one embodiment, wherein, during the first sampling of said first sound signal, the quantization resolution is substantially equal to 16 bits. In one embodiment, the attenuation of said low frequencies lower than 50 Hz is 6 dB per octave. In one embodiment, during the sub-sampling, the second sampling frequency is substantially equal to 10 kHz.

In one embodiment, the method comprises steps subsequent to the step of sub-sampling said first sound signal:
  dividing said first signal defining an input signal of a filter sub-sampled into a plurality of segments having a predetermined duration,
  analyzing each segment to provide the coefficients of a predictive filter, said coefficients of said predictor filter being variable in time, said coefficients being used to predict a value of the segment,
  determining the existing correlation between consecutive segments among said plurality of segments to determine unintelligibility of the signal,
  determining the error of the prediction by comparing, for each segment, the predicted value of the segment and its value measured at the input of the filter,
  implementing filtering based on the error of the prediction and the existing correlation to define the second sound signal unintelligible for the recipient.

In one embodiment, the method comprises a step of, during the step of implementing the filtering based on the error of the prediction and the existing correlation, filtering for each segment at least three formants to define a formant plot representative of said second signal. In one embodiment, the method comprises a step of imposing a minimum frequency distance between two formants.

BRIEF DESCRIPTION OF THE DRAWINGS

Other features and advantages will emerge from the description given below by way of non-limiting example, with reference to the appended drawings, wherein.

DETAILED DESCRIPTION

Embodiment Examples of the Invention

Figure 1:
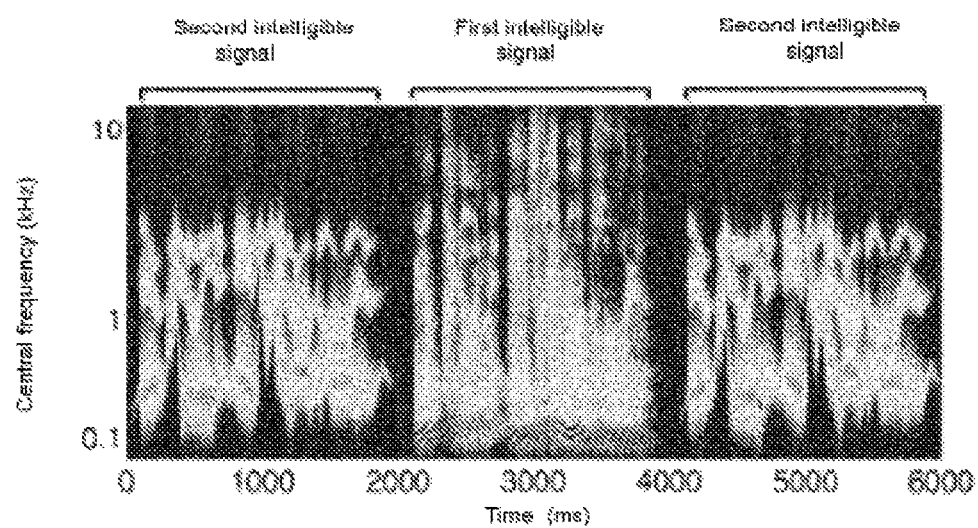
FIG. 1 illustrates a time-frequency analysis of the signals used in an exemplary embodiment of the invention on a logarithmic frequency scale, with the magnitude indicated by the gray level/the patterns.

The invention relates to a method for transmitting an item of information in a communication channel connecting a transmitter to a recipient. Such a communication channel may, for example, be a data network such as the Internet. The transmission channel may be wired or wireless, and the invention is independent of the underlying infrastructure used to implement the invention. The originality of the invention is to improve the capacity for recording, preserving and restoring an item of information for a recipient, not by the resolution of semantic ambiguity, but rather how to transmit and process an item of information, especially via acoustic processing of an item of information to be transmitted.

The method for transmitting an item of information in the communication channel connecting the transmitter to the recipient comprises the following successive steps:
  a) determining, by the transmitter, a first intelligible sound signal representative of said item of information to be transmitted,
  b) acoustic processing, by the transmitter, of said first sound signal to produce a second unintelligible sound signal for the recipient,
  c) transmission of said second sound signal from the transmitter to the recipient,
  d) transmission of said first sound signal from the transmitter to the recipient, said transmission of said first sound signal being triggered by said first transmission of said second sound signal,
  e) the second transmission of said second sound signal from the transmitter to the recipient, said second transmission of said second sound signal being triggered by said transmission of said first signal.

Typically, steps d) and e) are triggered after a predetermined period, preferably a period substantially equal to 250 ms.

In one embodiment of the invention, the acoustic processing is performed by implementing a so-called "sine-wave speech" algorithm to process an item of information usually consisting of speech material. For a naive recipient, the second signal from the "sine-wave speech" processing algorithm did not identify that verbal material or words are contained in this second signal. The listener would hear rather a series of unintelligible electronic noises. Conventionally, an intelligible sentence is a sentence which can be understood, that is, a sentence whereof the meaning can be grasped. Instead, an unintelligible sentence is a sentence that is not understood, that is, a sentence of which the meaning may not be understood. In the context of the present invention, a sentence presented as a sound signal is considered intelligible if at least half of its words are understood. Conversely, a sentence is considered unintelligible if fewer than half of its words are not understood. Understanding words may be established by a written report of the listeners, which will be compared word for word to the presented sentence.

Specifically, the processing algorithm is implemented to produce said second signal, the processing algorithm implements the following steps:
  sampling said first sound signal a first time,
  filtering said first sound signal to permit the passage of high frequencies of said first sound signal without attenuating them, said high frequencies being preferably predefined as being greater than 50 Hz, and attenuating low frequencies relatively lower than said high frequencies, then sub-sampling said first sound signal.

During the first sampling of said first sound signal, the first sampling frequency is preferably substantially equal to 44.1 kHz and its quantization resolution is preferably substantially equal to 16 bits. In one embodiment, the attenuation of said low frequencies lower than 50 Hz is 6 dB per octave. In one embodiment, during sub-sampling, the second sampling frequency is substantially equal to 10 kHz.

In one embodiment, subsequent to the step of sub-sampling said first sound signal, the method implements the Burg algorithm. More specifically, the method comprises the following steps:
- dividing said first signal defining an input signal of a filter sub-sampled into a plurality of segments having a predetermined duration,
- analyzing each segment to provide the coefficients of a predictive filter, said coefficients of said predictor filter being variable in time, said coefficients being used to predict a value of the segment,
- determining the existing correlation between consecutive segments among said plurality of segments to determine unintelligibility of the signal,
- determining the error of the prediction by comparing, for each segment, the predicted value of the segment and its value measured at the input of the filter,
- implementing filtering based on the error of the prediction and the existing correlation to define the second sound signal unintelligible for the recipient.

In one embodiment of the invention, during the step of implementing the filtering based on the error of the prediction and the existing correlation, the method implements the Viterbi algorithm. More specifically, the method comprises a step of filtering for each segment at least three formants to define a formant plot representative of said second signal. Preferably, the method implements a step of imposing a minimum frequency distance between two formants.

Other steps may be implemented to improve the acoustic processing of said first signal, in particular the method may:
- delete rapid variations due to the fundamental frequency, preferably by filtering the signal representing the estimated frequency of each formant in time to permit the passage of the low frequencies of said signal without attenuating them, the low frequencies being predefined as being lower than 20 Hz,
- avoid discontinuities between the voiced and unvoiced portions of the signal, preferably by filtering the signal representing the amplitude of the formants to permit the passage of low frequency of said signal without attenuating them, said low frequencies being predefined as being lower than 50 Hz.

FIG. 1 a illustrates time-frequency analysis of sound signals used in the experiment, on a logarithmic frequency scale, with the magnitude indicated by the variation of the grey levels. The first intelligible sound signal (shown in the middle in FIG. 1) is processed to filter only the frequencies and amplitudes of its three most prominent formants. The three estimates of the formants are synthesized by three simultaneous pure sounds. The second unintelligible sound signal is first transmitted (left in FIG. 1). Then, the first intelligible sound signal is transmitted. Finally, the second unintelligible sound signal is introduced again, identically, to the right in FIG. 1; it becomes perfectly intelligible, causing a "Eureka" moment for the recipient.

In most cases, the recipients understood fully during the second transmission of the second sound signal, so-called unintelligible, because hardly understandable for the recipient of the item of information transmitted. The hypothesis of the study was that this rapid change from the second unintelligible signal to the first intelligible sound signal would trigger a "Eureka" effect. This hypothesis was tested by measuring performance related to the capacities for restoring an item of information, contrasting essays containing the sequence of the steps according to the invention and so-called clear tests in which an intelligible sound signal is repeated a plurality of times. It is notable that the intelligible item of information is presented three more times in clear tests, and the recipients of an item of information have in theory more time to elaborate on the meaning to be given to the transmitted item of information. If the tests for implementing the method according to the invention show that the item of information transmitted was nevertheless better recorded, preserved and restored, this would indicate a strong influence of the ordering and processing of an item of information according to the implementation referred to here. After each test, a trusted judgment was collected from recipients of the item of information, to verify if they thought or not that the sequence of steps and acoustic processing addressed by this invention could influence their capacities for recording, preserving and restoring an item of information.

Method

Listener

To verify that the way to transmit and process an item of information positively impacts the capacities for recording, preserving and restoring a message by a recipient, eleven naive recipients (or listeners) were recruited. The average age of participants was 25.2 years with a standard deviation of 2.9 years. All participants were of French mother tongue. They report no logical audio, learning language, or neurological problems.

Verbal Material

To conduct this study, a base of 200 short sentences was built, by aggregating the material of two lists of French Audiology (Hearing in Noise Test, HINT, and Fournier lists, source: (College National d'Audioprothèse, CDs Audiométrie vocale (National College of Hearing Aid, CDs speech audiometry)). Intelligible versions of sentences, so-called clear versions of sentences (without background noise), were used. Ten sentences were not used because their semantic content was too close to other basic sentences. All sentences were pronounced by a male speaker. Examples are provided in Table 1.

| HINT List | FOURNIER List |
| --- | --- |
| The clown is really funny | The kid went to school |
| The truck is red | The bugle wakes the soldiers |
| The children run outside | The shoe no longer has a heel |
| He must take his vitamins | The garden surrounds the house |
| He lives in the jungle | The ring sparkles on a finger |
| Frogs are green | The train pulls in to the station |
| His jacket has a hole | The trail leads to the woods |
| The dog slept outside | The jester entertains the king |
| The merchant sells sweets | The bull enters the arena |

Sine-Wave Speech

Each of the 190 sentences used was processed by sine-wave speech, using the software platform Praat (Boersma, 2001) and a script developed by C. Darwin (Darwin, 2003; Brungart et al, 2005). The default values for an estimate with 3 formants for a male voice were used. Briefly, the algorithm was as follows. The clear sentences were sampled at 44.1 kHz with 16 bits resolution. They were then enhanced (50 Hz high-pass cutoff frequency and 6 dB/octave slope) and re-sampled at 10 kHz. Then, every 10 ms the Burg algorithm was used to estimate five poles of an LPC filter (linear predictive-coding, Childers, 1978). A Viterbi algorithm was then applied to select, in each analysis window that is, in each sample having in this case a period of 10 ms, the three best candidates for inclusion in the formant plots. The algorithm minimized i) frequency jumps between analysis windows; ii) the distance between the estimate and the reference values for the frequency positions of formants; iii) it imposed a minimum frequency distance between formants. The signal representing the estimated frequency of each formant over time was then low-pass filtered at 20 Hz to remove rapid changes due to the fundamental frequency. The signal representing the amplitude of the formants was low-pass filtered at 50 Hz to avoid discontinuities between the voiced and unvoiced portions of the speech. The resulting estimates of frequency and amplitude were finally used to generate three simultaneous pure sounds, therefore following the evolution of the 3 most prominent formants of the speech material. Known to the skilled person of speech processing, the Burg algorithm minimizes a distance of least squares between the prediction of an auto-regressive model and the input signal, and the Viterbi algorithm aims to provide, for a series of temporal observations from several sources, the likeliest sequence of events.

Procedure

Figure 2:
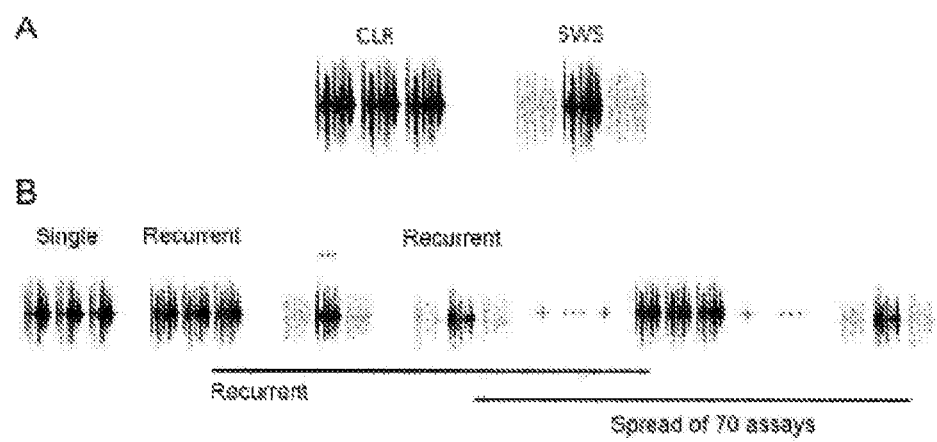
FIG. 2 illustrates the experimental procedure to assess the impact of an embodiment of the method referred by the invention.

Two types of tests were used. In the first type of test corresponding to the CLR signal shown in FIG. 2A, the clear conditions (CLR) corresponding to a first intelligible sound signal, the same sentence was presented three times in succession (the same first intelligible sound signal was therefore presented successively three times), with a break of approximately 250 ms between repetitions. In the second type of test corresponding to the SWS signal (sine-wave speech conditions), a sentence corresponding to the second unintelligible signal was first presented in the form of its sine-wave analog, then the same sentence was presented in clear (that is, presented as the first intelligible sound signal), and finally the sine-wave analog corresponding to the second unintelligible signal was introduced again (FIG. 1 and FIG. 2A). The pause between repetition was still of approximately 250 ms. After each test, the listeners were asked if they thought they had heard the item of information in a previous test, during the experiment. The first question was on the screen of a computer and the listeners answered with a specific answer box. Then a second question so-called "trust" question was put on the screen, asking the listeners if they were confident or not in their answer, using a scale of 1 to 3 (low, medium, or high confidence). A fourth option was possible to report an error on the main task of memory. The listeners answered via the computer keyboard. A total of 320 tests was presented for each listener (FIG. 2B). From these tests, 90 were single tests, in which a new item of information was presented. Another set of 200 tests were repeating tests. These tests were first introduced at the beginning of the experiment (100 tests, expected correct answer "never heard") and resubmitted identical after 70 tests (100 tests, correct answer expected "already heard"). Half of these recurring tests was in CLR conditions and the other half provided in SWS conditions. Finally, given that such a protocol would introduce an initial series of 70 tests without correct answer "already heard", random repetitions of nominally unique tests were introduced at the beginning of the experiment. These tests are not included in the analysis of the results.

Results

Figure 3:
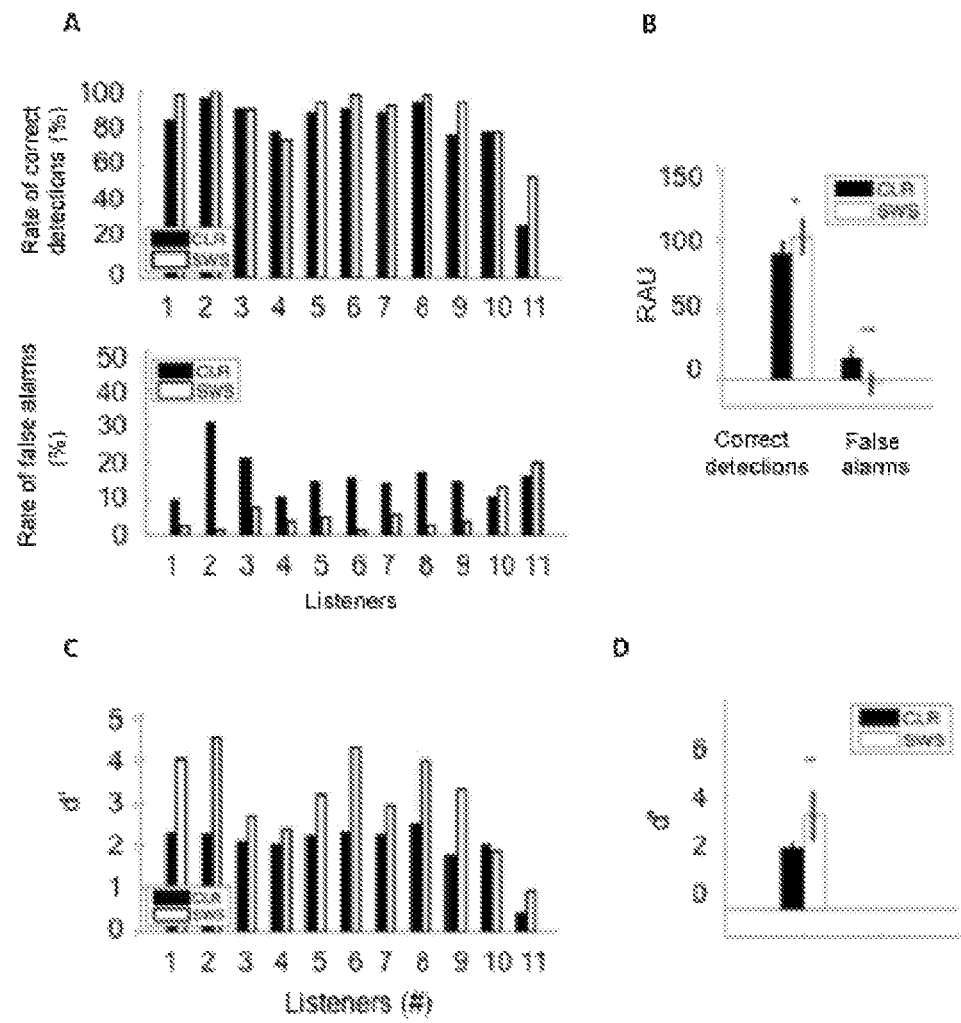
FIG. 3 illustrates the results from the experimental procedure shown in FIG. 2, the results showing the number of correct detections and false alarms depending on the method used to transmit an item of information to the recipient.

Memory question answers have conventionally been coded into four categories: i) correct detections, for the tests where listeners have correctly reported having already heard the item of information that is, the sentence and that it is a recurrent test; ii) false alarms, for the tests where listeners erroneously report having already heard the item of information that is, the sentence but it is actually a single test; iii) missed, for the tests where the listeners do not report having already heard the item of information so that it is a recurring test; iv) correct rejections, for the tests where listeners correctly answer having not already heard an item of information and that it is a single test. Because correct and missed detections add up to 100%, as well as false alarms and correct rejections, only the correct detections and false alarms are reported. FIG. 3A illustrates the individual data for the correct detections (Hits) and false alarms (FA) rates for the 11 listeners, a contrast between the clear conditions (CLR) and the sine-wave speech conditions (SWS). The correct detection rates were generally high, and the rate of false alarms generally low, indicating that most of the subjects were able to perform well. For all the listeners except one, the correct detections were higher for the SWS condition compared to the CLR condition. In addition, false alarms were also lower for the SWS condition. These two observations indicate better performance for the SWS condition corresponding to how to transmit and process an item of information from the CLR condition corresponding to the repetition of the first intelligible signal. Since the scores were sometimes close to ceiling values for correct detections or floor values for false alarms, a RAU transform was applied to raw data (Rationalized-Arcsine Unit transform; Studebaker, 1985) before analyzing the averaged trends. The average values in RAU are illustrated in FIG. 3B. Again, the analysis indicates higher detection rates (statistics here and in the rest of the document, paired bilateral t-test, $t(9)=3.2373$, $p=0.0012$); and false alarms fewer in number ($t(9)=4.6299$, $p=0.0012$) for the SWS conditions. The statistics used are a Student t test, which estimates the probability p of observing the data obtained under the null hypothesis. A low value of p, for example below the threshold of 0.01 (1% chance), indicates that the results were less than 1% probability of being due to chance. Then, the sensitivity index d' defined by the theory of signal detection (Macmillan & Creelman, 2001) was calculated. This index combines the correct detections (Hits) and false alarms (FA) raw values. A high index d' indicates a good overall performance. Individual and average results of this new analysis are shown in FIGS. 3C and 3D, respectively. The index d' was higher for the SWS conditions compared with the CLR condition ($t(9)=4.6555$, $p=0.0012$).

In short, individual raw data, RAU analyses, and analyses d' all converge to indicate a significant benefit in terms of improved capacities for recording, preserving and restoring an item of information for a receiver compared to a method implementing a plurality of repetitions of the same intelligible signal not undergoing processing to make it unintelligible.

Figure 4:
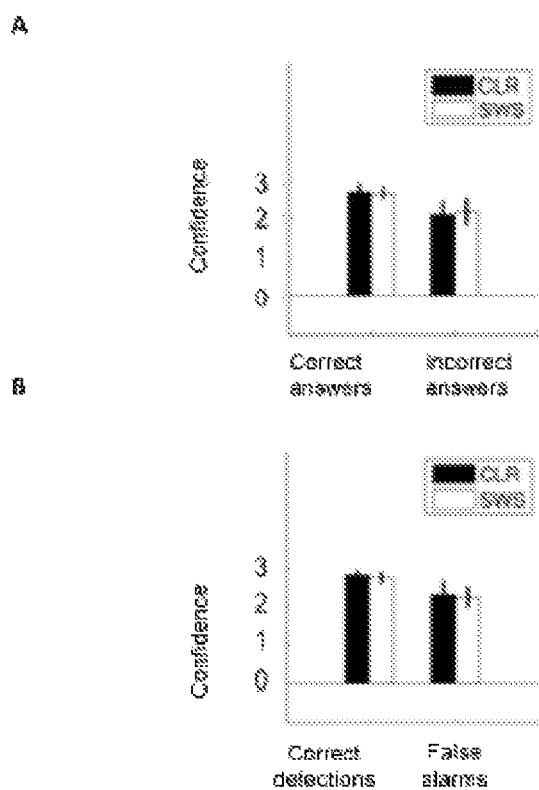
FIG. 4 illustrates the confidence judgments made by the listeners about their answer on the memory task. The results show that listeners are not aware that the method described by the invention improves their memory performance.

Confidence judgments were processed as follows. The tests for which the listeners reported having made a mistake on the question of memory that is, the question that they thought they already heard an item of information in a previous test or not, were re-encoded for analysis of the memory task, but omitted from analysis of the confidence task. Such errors were reported rarely (between 0 and 4 errors reported per listener, or average 0.5% of tests). Confidence judgments for the other tests were averaged, contrasting the CLR and SWS conditions as well as correct or incorrect answers on the memory task (FIG. 4A). Listeners were generally moderately to highly confident. They were more confident about the tests they had answered correctly on the memory task compared to the incorrect tests (analysis of variance (ANOVA) with repeated measures $F(1,9)=9.780$, $p=0.003$). ANOVA is a generalization of the t-test with the same interpretation. Here the tests for which the listeners have made a mistake in the memory task are called "incorrect tests": either they said they had already heard a sentence when it was not the case (false alarm/FA), or then they said they had not already heard a sentence whereas this was the case (missed/Miss). Therefore, their confidence metacognitive judgments on the memory task were generally appropriate. Conversely, and importantly, there was no difference between the SWS and CLR conditions ($F(9)=1.746$, $p=0.196$), and no interaction between condition and correct answer ($F(9)=2.120$, $p=0.155$). This indicates a complete disconnect between the performance of the participants, which was objectively better for the SWS conditions and confidence in their judgment. In other words, the listeners were not aware that the SWS tests including a time "Eureka" improved the capacities for recording, preserving and restoring an item of information.

The invention claimed is:

1. A method for transmitting an item of information in a communication channel connecting a transmitter to a recipient, the method comprising the following successive steps:
    a) determining, by the transmitter, a first intelligible sound signal representative of said item of information to be transmitted;
    b) acoustic processing, by the transmitter, of said first sound signal to produce a second unintelligible sound signal for the recipient;
    c) transmission of said second sound signal from the transmitter to the recipient;
    d) transmission of said first sound signal from the transmitter to the recipient, said transmission of said first sound signal being triggered by said transmission of said second sound signal; and
    e) the second transmission of said second sound signal from the transmitter to the recipient, said second transmission of said second sound signal being triggered by said transmission of said first signal.

2. The method according to claim 1, wherein steps d) and e) are triggered after a predetermined period.

3. The method according to claim 1, wherein, during the processing step, a processing algorithm is implemented to produce said second signal, the processing algorithm implementing the following steps:
    sampling said first sound signal a first time, and
    filtering said first sound signal to permit the passage of high frequencies of said first sound signal without attenuating them, said high frequencies being preferably predefined as being greater than 50 Hz, and attenuating low frequencies relatively lower than said high frequencies, then sub-sampling said first sound signal.

4. The method according to claim 3, wherein, during the first sampling of said first sound signal, the first sampling frequency is substantially equal to 44.1 kHz.

5. The method according to claim 3, wherein, during the first sampling of said first sound signal, the quantization resolution is substantially equal to 16 bits.

6. The method according to claim 3, wherein the attenuation of said low frequencies lower than 50 Hz is 6 dB per octave.

7. The method according to claim 3, wherein, during the sub-sampling, the second sampling frequency is substantially equal to 10 kHz.

8. The method according to claim 1 comprising steps subsequent to the step of sub-sampling said first sound signal:
    dividing said first signal defining an input signal of a filter sub-sampled into a plurality of segments having a predetermined duration;
    analyzing each segment to provide the coefficients of a predictive filter, said coefficients of said predictor filter being variable in time, said coefficients being used to predict a value of the segment;
    determining the existing correlation between consecutive segments among said plurality of segments to determine unintelligibility of the signal determining the error of the prediction by comparing, for each segment, the predicted value of the segment and its value measured at the input of the filter; and
    implementing filtering based on the error of the prediction and the existing correlation to define the second sound signal unintelligible for the recipient.

9. The method according to claim 8, comprising a step of, during the step of implementing the filtering based on the error of the prediction and the existing correlation, filtering for each segment at least three formants to define a formant plot representative of said second sound signal.

10. The method according to claim 9, comprising a step of imposing a minimum frequency distance between two formants.

* * * * *